United States Patent Office 3,704,146
Patented Nov. 28, 1972

3,704,146
CERAMIC WHITEWARE COMPOSITIONS COMPRISING A BORATE FLUX
Joseph Dulat, Fetcham, England, assignor to United States Borax & Chemical Corporation, Los Angeles, Calif.
No Drawing. Filed Dec. 2, 1969, Ser. No. 881,577
Claims priority, application Great Britain, Dec. 3, 1968, 57,372/68
Int. Cl. C04b 33/00
U.S. Cl. 106—45                     1 Claim

ABSTRACT OF THE DISCLOSURE

Flux for ceramic compositions having 30–60% $B_2O_3$, 20–60% $SiO_2$, 5–30% CaO and/or MgO and 0–15% $Na_2O$.

---

This invention relates to fluxes for ceramic compositions of the type comprising (a) clay, (b) flint, and (c) a flux. From a ceramic composition of this type are made by firing the composition, the shaped bodies known as "white-ware," such as porcelain, pottery and earthenware.

In ceramic compositions of the type hereinbefore defined, the clay is normally a mixture of ball clay and china clay, and the flint may be finely powdered silica, generally calcined. The flux is included in the composition to make it possible to fire the composition successfully at a lower temperature; conventional fluxes include stone (e.g. Cornish Stone), feldspar and nepheline syenite.

A description of certain compositions of the type hereinbefore defined is to be found in the "Encyclopaedia of Chemical Technology" (Kirk-Othmer) volume 3 (1954), pages 545–574, published by the Interscience Encyclopaedia, in an article entitled "Ceramics (White-Ware)."

We have now discovered a novel flux for a ceramic composition, comprising a ground frit having an analysis, in terms of oxides: $SiO_2$—20–60%; $B_2O_3$—30–60%; CaO and/or MgO—5–30%; and $Na_2O$—0–15%. All parts and percentages in this specification are by weight.

The invention includes not only this flux, but also a method of forming it which comprises (1) forming a mixture of compounds containing oxygen, silicon and calcium and/or magnesium, and optionally sodium, such that the mixture has an analysis, in terms of oxides, as defined above, (2) heating the mixture until a homogeneous melt is formed and then cooling the melt, and (3) grinding the cooled mixture.

The invention extends also to a ceramic composition comprising (a) clay, (b) flint and (c) a flux, in which component (c) is the novel flux. Further, the invention embraces a ceramic composition comprising (a) clay, (b) flint and (c) a flux, in which component (c) is the novel flux together with another flux. The invention also embraces a ceramic body formed by firing one of the present compositions and to such a body which has been glazed.

Where the novel flux is used together with a conventional flux, there is, of course, usually less conventional flux than standard practice would require. When the flux is a mixture of the novel flux and another flux, the other flux usually constitutes at most one-half, and often at most one-third of the total flux.

In general, when the novel flux replaces stone, it is found that a smaller proportion than of the replaced stone is needed. For example, a composition may require 15 parts of stone to give a desired result in the fired body, while the corresponding composition may require only 5 parts of the novel flux of this invention.

Although the novel flux may have no sodium content, it is preferred that the $Na_2O$ analysis be about 5–10%.

The preferred analysis of $B_2O_3$ is 40–50%, of $SiO_2$ is 25–35%, and of CaO and/or MgO is 10–20%. Thus, possible and preferred analyses in terms of oxides are, as percentages:

|  | Possible | Preferred |
|---|---|---|
| $Na_2O$ | 0–15 | 5–10 |
| CaO and/or MgO | 5–30 | 10–20 |
| $B_2O_3$ | 30–60 | 40–45 |
| $SiO_2$ | 20–60 | 25–35 |

In the present preparation of the novel flux, a mixture of the appropriate starting materials is first formed. The starting materials are usually in the form of powders and usually are thoroughly mixed. The next step is to heat until a homogeneous melt is formed. When the mixture of materials is heated to a temperature above the melting point of the lower-melting ingredients such as boric oxide (45° C.) or calcium borate, the higher-melting ingredients such as lime, magnesia or silica begin to dissolve in the molten ingredient, forming a complex of indeterminate structure but of the same oxide analysis as the starting materials. The mixture should be heated to such a temperature that it is entirely liquid so that the individual components can be intimately intermixed and any reaction between the components takes place freely. Thus the initial mixture must be heated to a temperature which is within the melting range of the cooled melt. When calcium in the form of its oxide is to be present in the flux then a temperature of at least 1,000° C., usually of the order of 1,100° C., is generally necessary, the exact temperature being dependent upon the proportions of the respective ingredients, and when magnesium in the form of its oxide is to be in the flux rather higher temperatures may be needed.

The starting materials can be any which result in a satisfactory flux. It is especially preferred, however, that the silicon content be provided in the form of silica precipitated from a silica sol. Since the preparation of the flux involves the production of a homogeneous melt, a wide choice of borates may be employed as starting material. At least part of the calcium and boron may be provided in the form of calcium borate ($2CaO \cdot 3B_2O_3$). At least part of the sodium and boron may be provided in the form of borax, $Na_2B_4O_7 \cdot 10H_2O$, or anhydrous sodium tetraborate. Another convenient starting material is ulexite, $NaCaB_5O_9 \cdot 8H_2O$, thereby providing $Na_2O$, CaO and $B_2O_3$. Calcium borate even in the form of a relatively crude ore (providing it is free from excessive amounts of objectionable contaminants, particularly iron) can be employed, as can low-value ores of calcium borosilicates such as howlite and datolite. Magnesium borate and calcium magnesium borate may also be employed. Calcium and magnesium can also be supplied in the hydroxide or oxide. Often a mixture of a calcium borate and calcium hydroxide are included. A preferred combination is calcium or magnuesium hydroxide, oxide, or borate, silica, and a sodium borate, such as anhydrous sodium tetraborate, or boric acid.

The 20–60% $SiO_2$ content in the novel flux has a notable beneficial effect on the strength of the ceramic bodies which can be produced. The flux is particularly advantageous since a lower proportion of it can usually result in an earthenware body at least equivalent to an earthenware body containing a higher proportion of a conventional flux. Thus, the flux whose analysis, in terms of oxides, is in the ranges 5–10% $Na_2O$, 10–20% CaO, 40–45% $B_2O_3$ and 33% $SiO_2$, used at 5 parts per 85 parts of a standard clay/flint mixture is equivalent, and in some respects superior, to a conventional flux used at 15 parts per 85 parts of the standard clay/flint mixture; this is demonstrated hereinafter.

A further advantage of the novel flux is that it results in an optimum firing temperature often about 50° C. lower than normally required. Furthermore, lower density bodies with comparable and sometimes superior strength compared to that of conventional bodies can usually be made with the new flux. In addition, the new flux can readily be controlled to provide uniformity in composition and quality, together with flexibility which enables the composition to be varied to suit specific needs.

The novel flux is generally present to the extent of less than 15% of the ceramic composition, such as 1–10% and preferably 3–6%, by weight.

The invention is illustrated by the following example.

EXAMPLE (a) Preparation of fluxes

The materials used to prepare the fluxes, and the quantities of the material employed, are shown in Table I below.

25 parts ball clay:                                         Parts by weight
   Vitblend 343 ball clay _____ 5
   B.W.S. ball clay _____ 5
   E.W.V.A. ball clay (pH value 5.1) _____ 5
   E.O.B.C. ball clay (pH value 5.2) _____ 5
   Fayles blue ball clay _____ 5
   S.C. china clay (pH value 4.5) _____ 12½
   C.C. china clay (pH value 4.5) _____ 12½
   Flint _____ 35

The mixtures were blunged, passed through a 120 mesh British Standard sieve, and dried on plaster bats to a plastic consistency.

Each mixture was then passed through a pug mill, made into ½ inch diameter rods approximately 6 inches in length from which ovoids were rolled by hand. Each rod and ovoid was marked and numbered for future reference.

(c) Firing of bodies

Ten rods, four ovoids and two deformation pieces of each body were placed in an oven at 110° C. to dry, after

TABLE I

| Flux Code No. | Weight of materials taken in preparing the fluxes ||||| Analyses of the fluxes, percent ||||
|---|---|---|---|---|---|---|---|---|---|
| | Calcium borate ore | Boric oxide | Anhydrous borax | Calcium hydroxide | Silica | $Na_2O$ | CaO | $B_2O_3$ | $SiO_2$ |
| 24 S50 | | 112–5 | 97.5 | 119.1 | 150 | 6.7 | 20 | 40 | 33.3 |
| A S50 | 192 | | 150 | | 150 | 10.3 | 11.7 | 44.7 | 33.3 |

The stated quantities of materials were weighed out, thoroughly mixed by hand, placed in a graphite crucible and introduced into a gas-fired furnace; this was brought slowly to 1,200° C. at which temperature the mixture had formed a melt. The crucible was removed from the furnace and the melt quenched by pouring into a little water. The mixture was recovered, placed in an evaporating dish and put into an electric oven at 110° C. to dry. When dry, the mixture was placed in a porcelain ball mill charged with steel balls and milled for 16 hours (overnight). The following morning the resultant powder was passed through a 200 mesh British Standard sieve. A magnet was finally passed through the powder to pick up any ion filings.

(b) Preparation of bodies

One body was prepared from each flux by mixing 85 parts of standard body mix with 5 parts of flux. For comparative purposes, a standard earthenware body (denoted S.E.) made by mixing 85 parts of standard body mix with 15 parts of stone was also prepared.

The mix used in preparing these bodies was prepared from five different ball clays and two different china clays, for purpose of experiment; plainly one might use a single clay of each type. The mix used had the following compositions:

which they were put into a kiln and fired at 50° C./hour with a 2 hour soak at peak.

Four firings were done for each body, namely at 1,050° C., 1,080° C., 1,100° C., and 1,150° C.

(d) Determination of physical properties of bodies

Properties of the bodies after firing are shown in the following Tables II and III.

TABLE II.—PHYSICAL PROPERTIES OF BODIES AFTER FIRING

| Properties | Body ||||||||||||
|---|---|---|---|---|---|---|---|---|---|---|---|---|
| | 24 S50 |||| A S50 |||| SE ||||
| Firing temperature, °C | 1,050 | 1,080 | 1,100 | 1,150 | 1,050 | 1,080 | 1,100 | 1,150 | 1,030 | 1,060 | 1,080 | 1,150 | 1,200 |
| Apparent porosity, percent | 24.1 | 21.5 | 17.9 | 11.2 | 18.1 | 13.0 | 10.1 | 4.6 | 29.4 | 26.2 | 23.2 | 12.4 | 5.2 |
| Water absorption, percent | 12.5 | 10.9 | 8.6 | 5.2 | 8.4 | 5.9 | 4.5 | 2.1 | 16.0 | 13.7 | 11.7 | 5.6 | 2.3 |
| Bulk density, g./cu. in | 1.86 | 1.91 | 2.00 | 2.05 | 1.92 | 2.03 | 2.12 | 2.20 | 1.82 | 1.90 | 1.99 | 2.20 | 2.29 |
| Dry-fired volume shrinkage, percent | 18.2 | 18.8 | 21.7 | 26.0 | 15.1 | 17.9 | 24.6 | 23.8 | 3.9 | 8.2 | 11.8 | 20.2 | 24.0 |
| Linear shrinkage, percent | 6.5 | 6.8 | 7.8 | 9.5 | 5.3 | 6.4 | 9.0 | 12.4 | 1.3 | 2.8 | 4.1 | 7.2 | 8.7 |
| Deformation, degrees | 12 | 13 | 12 | 14 | 12 | 11 | 12.5 | 12.5 | (*) | 4 | 4 | 8 | 14 |
| Modulus of rupture, lbs./sq. in | 5,640 | 6,090 | 7,080 | 7,720 | 6,140 | 5,800 | 8,330 | 9,500 | 2,560 | 3,700 | 4,750 | 7,980 | 8,830 |
| Color | C | C | C | G | C | C | W | G | W | W | W | W | C |
| Surface texture | S | S | S | R | S | S | S | R | S | S | S | S | S |

NOTES.—W=White; C=Creamish; G=Grayish; S=Smooth; R=Rough; *=not determined.

The apparent porosity was measured as follows. An ovoid was weighed dry and then evacuated for 1 hour in a vacuum desiccator down to a pressure of 3 cm. of mercury or less. Distilled water, which in the meantime had been boiled and cooled rapidly in cold water in order to remove dissolved air, was admitted to the desiccator. When the air had ceased to come off from the pieces, the vacuum was broken, the beaker containing the ovoids in water was removed, and boiled for 20 minutes. They were then allowed to soak for at least 4 hours but preferably overnight. The ovoids were then weighed, suspended, using a bridge on the balance. The surplus water was then removed from the ovoids with a damp cloth and weighed.

If the weight of the dry test piece=A g.

If the weight of the suspended test piece=B g.

If the weight of the soaked test piece=C g.
then apparently $$\text{porosity} = \frac{C-A}{C-B} \times 100\%$$

The water absorption was calculated from the results above as being $$= \frac{C-A}{A} \times 100\%$$

The dry-fired shrinkage was determined as follows. When calcuating the bulk density, the bulk volume had to be determined. The difference between the bulk volumes of "green" and fired body is the volume shrinkage, which can be expressed as a percentage on the dry bulk volume basis.

The linear shrinkage was derived from the volume shrinkage by the formula:

$$a = 100 - 10\sqrt[3]{(1000-10c)}$$

where a=percent linear shrinkage
c=percent cubic shrinkage.

The deformation was determined by the method described by Edwards and Holdridge in Trans. Brit. Ceram. Soc., 63, (5), 249, 1964. The test piece was formed from a dry rod by inserting it into the jig, and scraping down the exposed sides with a razor. Two of these test pieces for each suitable body were made, being supported in a refractory base at an angle of 45°. This set-up was placed in the kiln, together with the rods and ovoids. After firing and cooling the angle through which these test pieces have bent is expressed as the angle of deformation.

The modulus of rupture was determined as follows. Rods dried at 110° C. were placed between the knife edges, which were 4 inches apart, of a modulus of rupture machine. A constant rate of load was applied, this being 200 lbs./min.

$$\text{Modulus of rupture} = \frac{8lw}{\pi d^3}$$

where $l$=span (in.); $w$=load (lbs.); $d$=diameter of rod (in.)

Average of results on 10 rods was taken as the reading.

TABLE III.—THERMAL EXPANSION OF FIRED BODIES

| Body with flux Code No. | Firing temp., °C. | Thermal expansion, percent | | | |
|---|---|---|---|---|---|
| | | 20–500° C. | 20–560° C. | 20–650° C. | 20–770° C. |
| 24 S50 | 1,050 | 0.303 | 0.366 | 0.455 | 0.484 |
| | 1,080 | 0.329 | 0.406 | 0.471 | 0.501 |
| | 1,100 | 0.313 | 0.373 | 0.445 | 0.484 |
| | 1,150 | 0.295 | 0.352 | 0.415 | 0.457 |
| A S50 | 1,050 | 0.329 | 0.387 | 0.485 | 0.517 |
| | 1,080 | 0.311 | 0.372 | 0.452 | 0.489 |
| | 1,100 | 0.317 | 0.377 | 0.460 | 0.502 |
| | 1,150 | 0.322 | 0.363 | 0.423 | 0.447 |
| S.E. | 1,060 | 0.300 | 0.363 | 0.464 | 0.499 |
| | 1,080 | 0.291 | 0.361 | 0.461 | 0.498 |
| | 1,150 | 0.320 | 0.381 | 0.474 | 0.512 |
| | 1,200 | 0.312 | 0.373 | 0.453 | 0.488 |

The thermal expansion was measured in a standard thermal expansion machine. The test piece, in the form of a rod, was about 3 inches long. This was placed in the tube and the rod brought into contact with it, so that one end was against the end of the tube, while the other end was in contact with the rod. The slight pressure of the spring in the dial gauge ensured that contact between the test piece and the rod was maintained throughout the experiment. The furnace temperature rose at a rate of 30° C./5 min. readings being taken every 30° C.

On the balance of properties, the optimum firing temperature of the standard earthenware body is in the region of 1,150° C. It can be seen from the properties recorded above in Table II that the closest fit with the properties of the standard body fired at 1,150° C. occurs for the test bodies fired at 1,100° C. Thus the optimum firing temperature of the test bodies is about 50° C. lower than that of the standard body.

Another advantage of the test bodies which can be seen from Table II is their lower bulk densities than that of the standard body. This enables a body of the same volume to be made with lesser material if the present compositions rather than a standard composition are employed.

I claim:

1. A composition for firing into a white-ware ceramic body consisting essentially of about 25 parts of ball clay, about 25 parts of china clay, about 35 parts of flint, and about 5 parts of a previously melted and solidified, finely divided flux consisting essentially of

| | Percent |
|---|---|
| $SiO_2$ | 25–35 |
| $B_2O_3$ | 40–45 |
| $Na_2O$ | 5–10 |
| CaO and/or MgO | 10–20 | said parts by weight.

References Cited

UNITED STATES PATENTS

| 2,155,721 | 4/1939 | Lee | 106—54 |
|---|---|---|---|
| 2,233,575 | 3/1941 | Bair | 106—45 |
| 2,511,679 | 6/1950 | Thiess | 106—54 |
| 2,776,899 | 1/1957 | Donahey | 106—45 |
| 2,782,126 | 2/1957 | Butler et al. | 106—46 |
| 2,862,827 | 12/1958 | Boyce et al. | 106—54 X |
| 3,413,133 | 11/1968 | Stalego | 106—54 X |
| 2,466,849 | 4/1949 | Hood | 106—54 |
| 2,693,668 | 11/1954 | Slayter | 106—54 |
| 2,839,414 | 6/1958 | Fenity et al. | 106—46 |
| 3,019,116 | 1/1962 | Doucette | 106—46 |

OTHER REFERENCES

Latimer, W. M. et al.: Reference Book of Inorganic Chemistry, New York, 1951, pp. 325–6.

TOBIAS E. LEVOW, Primary Examiner

W. R. SATTERFIELD, Assistant Examiner

U.S. Cl. X.R.

106—54, 313

UNITED STATES PATENT OFFICE
CERTIFICATE OF CORRECTION

Patent No. 3,704,146          Dated November 28, 1972

Inventor(s) Joseph Dulat

It is certified that error appears in the above-identified patent and that said Letters Patent are hereby corrected as shown below:

In Column 3, line 64, delete "ion filings" and insert --iron filings--;

line 30, delete "112-5" insert --112.5--.

In Column 5, line 11, the word "calcuating" should read --calculating--.

Singed and sealed this 22nd day of May 1973.

(SEAL)
Attest:

EDWARD M. FLETCHER, JR.
Attesting Officer

ROBERT GOTTSCHALK
Commissioner of Patents